United States Patent

Starcher et al.

[15] 3,681,438
[45] Aug. 1, 1972

[54] PREPARATION OF BICYCLO (2.2.1) HEPT-2-EN-YLMETHYL ACRYLATE

[72] Inventors: Paul Spencer Starcher, South East Charleston; Bertrand Donahay Ash, St. Albans, both of W. Va.

[73] Assignee: Union Carbide Corporation, New York, N.Y.

[22] Filed: Oct. 26, 1970

[21] Appl. No.: 84,182

[52] U.S. Cl....260/486 R, 106/287 R, 260/89.5 AW, 260/468 B
[51] Int. Cl.............................................C07c 69/54
[58] Field of Search..................................260/486 R

[56] References Cited

UNITED STATES PATENTS 2,730,548  1/1956  Bluestone et al..........260/486 R
3,243,416  3/1966  Caldwell et al............260/486 R

*Primary Examiner*—Lorraine A. Weinberger
*Assistant Examiner*—Paul J. Killos
*Attorney*—Paul A. Rose, Aldo John Cozzi and Francis M. Fazio

[57] ABSTRACT

Bicyclo [2.2.1]hept-2-en-5-ylmethyl acrylate and bicyclo[2.2.1]ept-2-en-5-methyl-5-ylmethyl methacrylate are produced by the pyrolysis of bicyclo[2.2.1]ept-5-en-2-methyl bicyclo[2.2.1]hept-5-en-2-carboxylate and bicyclo-[2.2.1]hept-5-en-2-methyl-2-ylmethyl bicyclo[2.2.1]hept-5-en-2-methyl-2-carboxylate, respectively, at temperatures of from about 180°C. to about 360°C. Pyrolysis at temperatures of about 360° and above produces allyl acrylate and 2-methylallyl methacrylate, respectively. The monomers produced can be polymerized by themselves or in admixture with other monomers to produce useful polymers and coating compositions.

9 Claims, No Drawings

PREPARATION OF BICYCLO (2.2.1) HEPT-2-EN-YLMETHYL ACRYLATE

This invention relates to pyrolytic methods for the production of certain acrylate and methacrylate esters.

Several methods are known for the production of bicyclo[2.2.1]hept-2-en-5-ylmethyl acrylate and bicyclo[2.2.1]-hept-2-en-5-methyl-5-ylmethyl methacrylate. However, these methods are not commercially attractive. In one method for making the former compound arcylyl chloride is reacted with 5-hydroxymethylbicyclo[2.2.1]hept-2-ene, but acrylyl chloride is not only expensive and difficult to make but it is also hard to handle. Another known method is the base catalyzed ester exchange reaction of 5-hydroxymethylbicyclo[2.2.1]hept-2-ene with ethyl acrylate. In this method one must use a relatively expensive acrylic ester and, further, the reaction is subject to a side reaction resulting in the formation of appreciable quantities of 5-[(ethoxycarboxylethoxy)methyl]bicyclo[2.2.1-hept-2-ene. Similarly, methods are known for the production of allyl acrylate and 2-methylallyl methacrylate.

It has now been found that these compounds can be made by the pyrolysis of readily available starting materials.

The bicyclo acrylyl compounds produced by the process of this invention are represented by the formula:

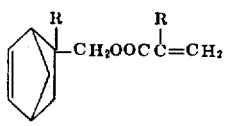

wherein R is hydrogen or methyl.

The allyl acrylyl compounds produced by the process of this invention are represented by the formula:

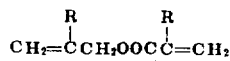

The compounds shown by formulas I and II are produced by the pyrolysis of the ester compounds of the general formula:

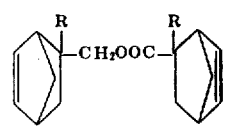

The conditions under which the pyrolysis is carried out are set forth in detail below.

The ester bicyclo[2.2.1]hept-5-en-2-methyl bicyclo-[2.2.1]hept-5-en-2-carboxylate, within the scope of formula III, is readily produced by the Diels-Alder reaction of acrolein and cyclopentadiene to form bicyclo-[2.2.1]hept-5-en-2-carboxaldehyde, this is then dimerized by the Tischenko reaction to form the ester. The ester bicyclo[2.2.1]hept-5-en-2-methyl-2-ylmethyl bicyclo[2.2.1]-hept-5-en-2-methyl-2-carboxylate, within the scope of formula III, is produced by the Diels-Alder reaction of methacrolein and cyclopentadiene to form bicyclo[2.2.1]-hept-5-en-2-methyl-2-carboxaldehyde, which is then dimerized by the Tischenko reaction to the ester. It is obvious, of course, that a substituted cyclopentadiene or dicyclopentadiene can be used in the Diels-Alder reaction. The two steps used to produce the ester compounds of formula III are well known to those skilled in the art.

In producing the bicyclo acrylyl compounds of formula I, the ester compounds of formula III are pyrolyzed at a temperature of from about 180°C. to about 360°C., preferably at a temperature of from about 250°C. to about 340°C. and most preferably at a temperature of from about 275°C. to about 325°C.

The allyl acrylyl compounds of formula II are produced by the pyrolysis of the ester compounds of formula III at a temperature above 360°C. and below the carbonization temperature, preferably at a temperature of from about 375°C. to about 500°C.

In the temperature range of from about 325°C. to about 425°C., or higher, mixtures of bicyclo acrylyl compounds of formula I and allyl acrylyl compounds of formula II are produced. The two can be separated by conventional distillation procedures.

The pyrolysis can be carried out at reduced pressure, atmospheric pressure, or increased pressure provided the ester undergoing pyrolysis can be vaporized under the conditions. Pressure is not critical to the reaction. Further, the pyrolysis can be carried out in the absence of a solvent or in the presence of an inert solvent such as benzene, toluene, xylene, n-octane, and the like. Any inert solvent can be used that does not deleteriously affect the reaction.

The following examples further illustrate the reaction.

EXAMPLE 1

To a flask, which was equipped with an addition funnel and stirrer, there was added a catalyst solution of 12.8 grams of aluminum isopropylate in 75 milliliters of benzene. To this solution there were added 256 grams of bicyclo[2.2.1]hept-5-en-2-carboxaldehyde over a period of 70 minutes. The reaction, which was mildly exothermic, was maintained at a temperature ranging from ambient to 35°C. After stirring an additional 48 hours at ambient temperature, the catalyst was neutralized by the addition of 13.56 grams of acetic acid. The reaction mixture was fractionally distilled through a 32 mm. by 10 inch column. There were obtained 200 grams (78.2 percent of theory) of liquid bicyclo[2.2.1] hept-5-en-2-methyl bicyclo[2.2.1]hept-5-en-2-carboxylate; b.p. 126°C./2 mm. — 139°C./4 mm., $n_D^{30}$ 1.5026–1.5060. The infrared structure was consistent with the assigned structure.

Anal. Calc'd for $C_{16}H_{20}O_2$: C, 78.65; H, 8.25
Found: C, 79.01; H, 8.53.

In the same manner, bicyclo[2.2.1]hept-5-en-2-methyl-2-ylmethyl bicyclo[2.2.1]hept-5-en-2-methyl-2-carboxylate is produced by the use of bicyclo[2.2.1]-hept-5-en-2-methyl-2-carboxaldehyde as the starting material. This latter starting material is produced by the reaction of methacrolein with cyclopentadiene by a procedure similar to that described above.

EXAMPLE 2

In a manner similar to that described in the above example, 880 grams of bicyclo[2.2.1]hept-5-en-2-carboxaldehyde were reacted in the presence of aluminum isopropylate catalyst to form bicyclo[2.2.1]hept-5-en- 2-methyl bicyclo[2.2.1]hept-5-en-2-carboxylate. A packed column, 1 by 24 inches, was used to distill the product. Eight fractions (737 grams), with a wide boiling range of from 60° to 140°C. at 3 mm. were isolated. The fractions were combined and redistilled through a 1 by 24 inches packed column at the conditions indicated in the table and twelve separate fractions were recovered.

| Fraction | Temp. °C. | Press. mm/Hg | Weight | $n_D^{30}$ |
|---|---|---|---|---|
| 1 | 40–43 | 0.20 | 52 g. | 1.4831 |
| 2 | 35 | 0.50 | 84 | 1.4809 |
| 3 | 50–56 | 1.00 | 22 | 1.4786 |
| 4 | 56–59 | 0.80 | 49 | 1.4786 |
| 5 | 59–85 | 0.40 | 20 | 1.4817 |
| 6 | 85–105 | 0.35 | 44 | 1.5018 |
| 7 | 104 | 0.40 | 31 | 1.5005 |
| 8 | 104–106 | 0.40 | 44 | 1.5040 |
| 9 | 106 | 0.40 | 44 | 1.5042 |
| 10 | 106 | 0.40 | 61 | 1.5046 |
| 11 | 103 | 0.35 | 84 | solid |
| 12 | no reflux | — | 44 | 1.5031 |

Over a period of 13 weeks of storage at room temperature, fractions 1 through 5 spontaneously polymerized to hard solid poly(bicyclo[2.2.1]hept-2-en-5-ylmethyl acrylate). During the distillation a selective reverse Diel-Alder reaction had occurred to convert a portion of the bicyclo[2.2.1]hept-5-en-2-methyl bicyclo[2.2.1] hept-5-en-2-carboxylate to bicyclo[2.2.1]hept-2-en-5-ylmethyl acrylate, this portion was recovered as fractions 1 through 5 and in the absence of inhibitor this compound polymerized on standing, as stated above. Fractions 6 through 10 were identified as bicyclo[2.2.1]hept-5-en-2-methyl bicyclo-[2.2.1]hept-5-en-2-carboxylate and fractions 11 and 12 were residue fractions that were not further identified.

EXAMPLE 3

To a 1 by 36 inches electrically heated pyrolysis tube, there were fed 244 grams of bicyclo[2.2.1]-hept-5-en-2-methyl bicyclo[2.2.1]hept-5-en-2-carboxylate as a solution in 570 grams of benzene. The tube was fitted with a Pyrex glass liner packed with 5 × 5 mm. glass Raschig rings. The solution was fed to the pyrolysis tube by means of a stainless steel pump at an average rate of 440 ml./hr. while maintaining an average temperature of 290°C. The pyrolyzate was fed directly into the middle of a 32 mm. × 54 inches distillation column packed with 3/16 inch triple-turn helices. Benzene, 300 grams, was charged to the still kettle and was maintained under total reflux at reduced pressure, 52°C./300 mm. To minimize polymerization of the bycyclo[2.2.1]hept-2-en-5-ylmethyl acrylate produced, monomethylether of hydroquinone, 2.4 grams, was added to the still kettle. At the end of the run, the benzene solvent was removed under reduced pressure by means of a rotary evaporator. The crude pyrolyzate was then distilled through a 1 inch by 5 inches Vigreaux column. Bicyclo[2.2.1]hept-2-en-5-ylmethyl acrylate, 44 grams, b.p. 55°C./0.05 mm., $n_D^{30}$ 1.4825, was isolated at a yield of 24.7 percent. The chemical efficiency was 68.5 percent based on the recovery of 156 grams of starting material.

EXAMPLE 4

A run similar to that described in Example 3 was made at a pyrolysis temperature of 360° to 370°C. The pyrolyzate was fed to a still containing benzene which was held under reflux at 79°C. and atmospheric pressure. Based on 244 grams of bicyclo[2.2.1]hept-5-en-2-methyl bicyclo[2.2.1]hept-5-en-2-carboxylate fed to the pyrolysis tube, there was isolated 78 grams of bicyclo[2.2.1]hept-2-en-5-ylmethyl acrylate, b.p. 45°C./.05 mm., $n_D^{30}$ 1.4810. The yield was 44.8 percent. The purity by saponification was 97.8 percent. Anal. Calc'd for $C_{11}H_{14}O_2$: C, 74.13; H, 7.92. Found: C. 73.72; H, 7.97. The infrared spectrum was consistent with the assigned structure.

The benzene portion, collected during the rotary evaporation step, was fractionally distilled through a 22 mm. × 14 inches packed column. Allyl acrylate was isolated, 17 grams, b.p. 50°–52°C./50 mm., $n_D^{30}$ 1.4300, at a yield of 17.9 percent. This shows that higher pyrolysis temperatures will produce allyl acrylate.

In the same manner, bicyclo[2.2.1]hept-2-en-5-methyl-5-ylmethyl methacrylate is produced by pyrolysis of bicyclo[2.2.1]hept-5-en-2-methyl-2-ylmethyl bicyclo[2.2.1]-hept-5-en-2-methyl-2-carboxylate as the starting material.

EXAMPLE 5

A run similar to that described in Example 4 was made at a temperature of 460°C. The benzene solution of the crude pyrolyzate was fractionally distilled through a 22 mm. × 18 inches packed column. Based on 244 grams of bicyclo[2.2.1]hept-5-en-2-methyl bicyclo[2.2.1]hept-5-en-2-carboxylate fed to the pyrolysis tube, there was isolated 76 grams of allyl acrylate, b.p. 53°C./50 mm., $n_D^{30}$ 1.4281, at a yield of 67.8 percent. No appreciable amounts of starting material or of bicyclo[2.2.1]hept-2-en-5-ylmethyl acrylate were recovered.

In the same manner, 2-methylallyl methacrylate is produced by the pyrolysis of bicyclo[2.2.1]hept-5-en-2-methyl-2-ylmethyl bicyclo[2.2.1]hept-5-en-2-methyl-2-carboxylate as the starting material.

EXAMPLE 6

The pyrolysis was carried out in a Dowtherm jacketed Pyrex tube 48 inches in length and one inch in diameter. The total heated volume was 226 cc., of which 139 cc. were packed with 5 mm. glass beads. The tube was connected at the bottom to a 500 ml. round-bottom receiver which was, in turn, connected by tubing to a Dry Ice trap. A feed line leading to the top of the tube was connected to a 500 ml. feed tank by way of a suitable pump. The feed line was heated by a complete wrapping of heating tape.

Bicyclo[2.2.1]hept-5-en-2-methyl bicyclo[2.2.1]-hept-5-en-2-carboxylate was fed in through the top of the pyrolysis tube at a rate of 70 ml./hour, or a volume/volume space velocity of 0.31 hr.$^{-1}$. At temperatures of 250°C and 280°C., the pyrolyzate collected in the receiver consisted almost entirely of bicyclo[2.2.1]hept-2-en-5-ylmethyl acrylate and unreacted starting material, with the cracked cyclopentadiene passing into the Dry Ice trap. To rid the pyrolyzate of the last trace of cyclopentadiene, each fraction was briefly heated at 50°C. under reduced pressure, about 25 mm. The crude pyrolyzate was stabilized with about 50 ppm of monomethyl ether of hydroquinone prior to distillation.

Following the procedure described above, 420 grams of bicyclo[2.2.1]hept-5-en-2-methyl bicyclo[2.2.1]-hept-5en-2-carboxylate was passed through the pyrolysis tube over a 6-hour period at a temperature of 250°C. A total of 402.6 grams of pyrolyzate was collected. Vacuum stripping to remove entrained cyclopentadiene provided 279 grams of material. Vapor phase chromatographic analysis indicated that the pyrolysis product mix was made up solely of bicyclo[2.2.1]hept-2-en-5-ylmethyl acrylate and unreacted starting material. Fractional distillation through a 24-inch spinning band column provided two cuts of pure bicyclo[2.2.1]hept-2-en-5-ylmethyl acrylate, b.p. 90°C. at 3.5 mm., weight 97.4 grams. Subsequent cuts, b.p. 96°–147°C. at 2 mm., weighing a total of 251.5 grams were recovered consisting of 25.2 grams of said acrylate and 226.3 grams of unreacted starting material, as determined by vapor phase chromatographic analysis. A dark viscous residue weighing 20 grams remained. Total yield of the desired acrylate, 122.6 grams, 0.689 mole, was 40.1 percent. Efficiency to the acrylate was 87.3 percent.

In a similar manner but at 280°C., a 6-hour feed of 411 grams of bicyclo[2.2.1]hept-5-en-2-methyl bicyclo[2.2.1]hept-5-en-2-carboxylate afforded 390 grams of pyrolyzate which, after stripping weighed 380 grams. Fractional distillation yielded two cuts of pure bicyclo[2.2.1]hept-2-en-5-ylmethyl acrylate, b.p. 85°–86C. at 3 mm., 117.4 grams, and several subsequent cuts, b.p. 86°–142°C. at 2 mm. consisting of 23.2 grams of said acrylate, and 208.3 grams of unreacted starting material. A heavy, intractable residue, 10.7 grams, remained. Total yield of the desired acrylate, 140.6 grams, was 47.0 percent. Efficiency to the acrylate was 95.7 percent.

EXAMPLE 7

This example shows the use of bicyclo[2.2.1]hept-2-en-5-ylmethyl acrylate to produce latex compositions.

Into a 500 ml. 5-neck flask equipped with an electric stirrer, brine-cooled reflux condenser, 10 ml. dropping funnel, thermometer, and nitrogen ebullition tube there were placed 135 grams of deaerated water, 15 grams of a commercial sulfonated surfactant (Abex 18 S), 100 grams of the monomers shown in Table I, and 2 grams of cumene hydroperoxide. The polymerization reaction was initiated in each instance by the addition of 1 ml. of 10 percent aqueous FeSO₄·7H₂O, upon which the temperature rose spontaneously to 40°C., generally within 5 minutes. This temperature was maintained thereafter by the slow, drop-wise addition of 10 percent aqueous NaHSO₃. After about 2 to 3 hours and the addition of from 7.5 to 12.5 ml. of NaHSO₃ solution, the reaction was judged complete, as shown by the inability of further additions of this activator to maintain the 40°C. reaction temperature. The latex was then strained into an amber bottle.

Useful films were cast, dried, and tested for insolubility by shaking overnight in 49 times their weight of a 90 percent acetone-10 percent water mixture. The results are summarized in Table I.

TABLE I

| Monomer Mix | | | |
|---|---|---|---|
| EA | MMA | BHMA | Percent Insolubles |
| 70% | 30% | 0% | 0.0% |
| 70% | 28% | 2% | 92.0% |
| 70% | 25% | 5% | 94.5% |
| 70% | 20% | 10% | 92.2% |
| 70% | 10% | 20% | 94.9% |

EA= ethyl acrylate
MMA= methyl methacrylate
BHMA= bicyclo[2.2.1]hept-2-en-5-ylmethyl acrylate

EXAMPLE 8

A polyester was produced by the reaction of 111 parts by weight of bicyclo2.2.1]hept-5-en-2,3-dicarboxylic acid anhydride, 146 parts by weight of 2,2-dimethyl-3-hydroxypropyl 2,2-dimethyl-3-hydroxypropionate and 6.56 parts by weight of pentaerythritol in 7 parts by weight of xylene. The reaction mixture was heated at from about 180°C. to about 205°C. until the solution had an acid number of about 10. The solvent was removed by distillation at reduced pressure while sparging with nitrogen.

70 grams of a polyester prepared as described above were dissolved in 30 grams of bicyclo[2.2.1]hept-2-en-5-ylmethyl acrylate to produce a coating solution having a Brookfield viscosity at 25°C. of 4,630 centipoises. The solution was coated on a steel panel and the coating was cured by exposure to 12 megarads of electron radiation from a 500 KEV insulated core transformer having an amperage of 15.9 milliamps. A hard, glassy finish was obtained having a Sward hardness of 40 and a Knoop hardness (A.S.T.M. D 1474) of 4.12. The coating was not affected by immersion at room temperature in 1 percent sulfuric acid for 24 hours or in 20 percent sodium hydroxide for 24 hours, and in boiling water for 1 hour.

What is claimed is:

1. A method for producing a bicyclo acrylyl compound of the formula:

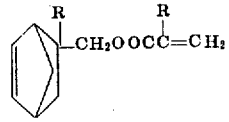

or an allyl acrylyl compound of the formula

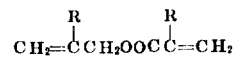

which comprises pyrolyzing an ester of the formula

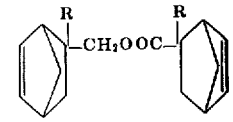

at a temperature of from about 180°C. to about 360°C. to produce said bicyclo acrylyl compound and at a temperature above 360°C. to produce said allyl acrylyl compound; R being hydrogen or methyl.

2. A method for producing a bicyclo acrylyl compound as claimed in claim 1, wherein the pyrolysis is carried out at a temperature of from about 250°C. to about 340°C.

3. A method for producing a bicyclo acrylyl compound as claimed in claim 1, wherein the pyrolysis is carried out at a temperature of from about 275°C. to about 325°C.

4. A method for producing bicyclo[2.2.1]hept-2-en-5-ylmethyl acrylate as claimed in claim 1 by the pyrolysis of bicyclo[2.2.1]hept-5-en-2-methyl bicyclo[2.2.1]-hept-5-en-2-carboxylate at a temperature of from about 180°C. to about 360°C.

5. A method as claimed in claim 4, wherein the pyrolysis temperature is from about 250°C. to about 340°C.

6. A method as claimed in claim 4, wherein the pyrolysis temperature is from about 275°C. to about 325°C.

7. A method for producing bicyclo[2.2.1]hept-2-en-5-methyl-5-ylmethyl methacrylate as claimed in claim 1 by the pyrolysis of bicyclo[2.2.1]hept-5-en-2-methyl-2-ylmethyl bicyclo[2.2.1]hept-5-en-2-methyl-2-carboxylate at a temperature of from about 180°C. to about 360°C.

8. A method for producing allyl acrylate as claimed in claim 1 by the pyrolysis of bicyclo[2.2.1]hept-5-en-2-methyl bicyclo[2.2.1]hept-5-en-2-carboxylate at a temperature above 360°C.

9. A method for producing 2-methylallyl methacrylate as claimed in claim 1 by the pyrolysis of bicyclo[2.2.1]hept-5-en-2-methyl-2-ylmethyl bicyclo[2.2.1]-hept-5-en-2-methyl-2-carboxylate at a temperature above 360°C.

* * * * *